(12) United States Patent
Cho et al.

(10) Patent No.: US 11,397,894 B2
(45) Date of Patent: Jul. 26, 2022

(54) METHOD AND DEVICE FOR PRUNING A NEURAL NETWORK

(71) Applicants: SK hynix Inc., Icheon (KR); Seoul National University R&DB Foundation, Seoul (KR)

(72) Inventors: Seunghwan Cho, Seoul (KR); Sungjoo Yoo, Seoul (KR); Youngjae Jin, Seoul (KR)

(73) Assignees: SK hynix Inc., Icheon (KR); Seoul National University R&DB Foundation, Seoul (KR)

(*) Notice: Subject to any disclaimer, the term of this patent is extended or adjusted under 35 U.S.C. 154(b) by 1063 days.

(21) Appl. No.: 16/022,391

(22) Filed: Jun. 28, 2018

(65) Prior Publication Data

US 2019/0057308 A1 Feb. 21, 2019

(30) Foreign Application Priority Data

Aug. 16, 2017 (KR) ........................ 10-2017-0103569

(51) Int. Cl.
| | |
|---|---|
| *G06N 3/08* | (2006.01) |
| *G06F 17/13* | (2006.01) |
| *G06N 5/04* | (2006.01) |
| *G06N 3/063* | (2006.01) |
| *G06N 3/04* | (2006.01) |

(52) U.S. Cl.
CPC ............. *G06N 3/082* (2013.01); *G06F 17/13* (2013.01); *G06N 3/0635* (2013.01); *G06N 5/046* (2013.01); *G06N 3/0454* (2013.01)

(58) Field of Classification Search
CPC ...... G06N 3/082; G06N 5/046; G06N 3/0635; G06N 3/0454; G06N 3/084; G06N 3/04; G06F 17/13
See application file for complete search history.

(56) References Cited

U.S. PATENT DOCUMENTS

| | | | |
|---|---|---|---|
| 10,515,312 B1* | 12/2019 | Kubo | ..................... G06N 3/084 |
| 2014/0040532 A1 | 2/2014 | Watanabe et al. | |
| 2015/0326695 A1* | 11/2015 | Pang | ........................ H04L 69/04 |
| | | | 370/477 |
| 2016/0140437 A1* | 5/2016 | Qiao | .................... G06N 3/0445 |
| | | | 706/21 |
| 2016/0321784 A1 | 11/2016 | Annapureddy | |
| 2016/0358070 A1* | 12/2016 | Brothers | .............. G06N 3/0454 |
| 2018/0046915 A1* | 2/2018 | Sun | ........................ G06N 3/082 |

(Continued)

FOREIGN PATENT DOCUMENTS

KR 10-2016-0143548 A 12/2016

OTHER PUBLICATIONS

Hao Li et al., Pruning Filters for Efficient Convnets, Mar. 10, 2017, 13 pages (Year: 2017).*

(Continued)

*Primary Examiner* — Omar F Fernandez Rivas
*Assistant Examiner* — Tri T Nguyen

(57) ABSTRACT

A method for pruning a neural network includes initializing a plurality of threshold values respectively corresponding to a plurality of layers included in the neural network; selecting one of the plurality of layers; adjusting the threshold value of the selected layer; and adjusting a plurality of weights respectively corresponding to a plurality of synapses included in the neural network.

15 Claims, 7 Drawing Sheets

(56) References Cited

U.S. PATENT DOCUMENTS

| | | | |
|---|---|---|---|
| 2018/0232640 A1* | 8/2018 | Ji | G06N 3/082 |
| 2019/0050735 A1* | 2/2019 | Ji | G06N 3/082 |
| 2019/0188567 A1* | 6/2019 | Yao | G06N 3/08 |

OTHER PUBLICATIONS

Song Han et al., "Learning both Weights and Connections for Efficient Neural Networks", Advances in Neural Information Processing Systems (NIPS), Oct. 30, 2015, pp. 1-9.

Hengyuan Hu et al., "Network Trimming: A Data-Driven Neuron Pruning Approach towards Efficient Deep Architectures", Jul. 12, 2016, arXiv:1607.03250v1.

Yoon-Hwan Cho et al., "Study on the activation functions for efficient learning in DNN", IEIE Proceedings of the Fall Conference 2016, Nov. 2016, pp. 800-803.

\* cited by examiner

METHOD AND DEVICE FOR PRUNING A NEURAL NETWORK

CROSS-REFERENCE TO RELATED APPLICATION

The present application claims priority to Korean Patent Application No. 10-2017-0103569, filed on Aug. 16, 2017, which is incorporated herein by reference in its entirety.

BACKGROUND

1. Field

Embodiments of the present disclosure relate to a method and device for pruning a neural network after a training operation is complete.

2. Description of the Related Art

Neural networks are widely used in artificial intelligence applications, such as image recognition and technologies used in autonomous vehicles.

In an example, a convolutional neural network includes an input layer, an output layer, and one or more inner layers between the input layer and the output layer.

Each of the output layer, the input layer, and the inner layers includes one or more neurons. Neurons contained in adjacent layers are connected in various ways through synapses. For example, synapses point from neurons in a given layer to neurons in a next layer. Alternately or additionally, synapses point to neurons in a given layer from neurons in a previous layer.

Each of the neurons stores a value. The values of the neurons included in the input layer are determined according to an input signal, for example, an image to be recognized. The values of the neurons contained in the inner and output layers are based on the neurons and synapses contained in corresponding previous layers. For example, the values of the neurons in each of the inner layers are based on the values of the neurons in a preceding layer in the neural network.

Each of the synapses has a weight. The weight of each of the synapses is based on a training operation of the convolutional neural network.

After the convolutional neural network is trained, the convolutional neural network can be used to perform an inference operation. In the inference operation, the values of the neurons in the input layer are set based on an input, and the values of the neurons in the next layers (e.g., the inner layers and the output layer) are set based on the values of the neurons in the input layer and the trained synapses connecting the layers. The values of the neurons in the output layer represent a result of the inference operation.

For example, in an inference operation, in which image recognition is performed by the convolutional neural network after the convolutional neural network has been trained, the values of the neurons in the input layer are set based on an input image, a plurality of operations are performed at the inner layers based on the values of the neurons in the input layer, and a result of the image recognition is output at the output layer from the inner layers.

In such an inference operation, various computations must be performed by all neurons in the convolutional neural network. As a result, a very large computation power is required to perform the inference operation using the conventional convolutional neural network.

SUMMARY

In an embodiment, a method for pruning a neural network includes initializing a plurality of threshold values respectively corresponding to a plurality of layers included in the neural network; selecting one of the plurality of layers; adjusting the threshold value of the selected layer; and adjusting a plurality of weights respectively corresponding to a plurality of synapses included in the neural network.

In an embodiment, a device for pruning a neural network includes a computing circuit configured to perform a convolution operation including an addition operation and a multiplication operation; an input signal generator configured to generate input data, and to input the input data to the computing circuit; a threshold adjusting circuit configured to adjust a threshold value of a selected layer among a plurality of layers in the neural network; a weight adjusting circuit configured to adjust a plurality of weights of a plurality of synapses, respectively, which are included in the neural network; and a controller configured to prune the neural network by controlling the threshold adjusting circuit and the weight adjusting circuit.

DETAILED DESCRIPTION

Hereafter, various embodiments will be described below in more detail with reference to the accompanying drawings.

Figure 1:
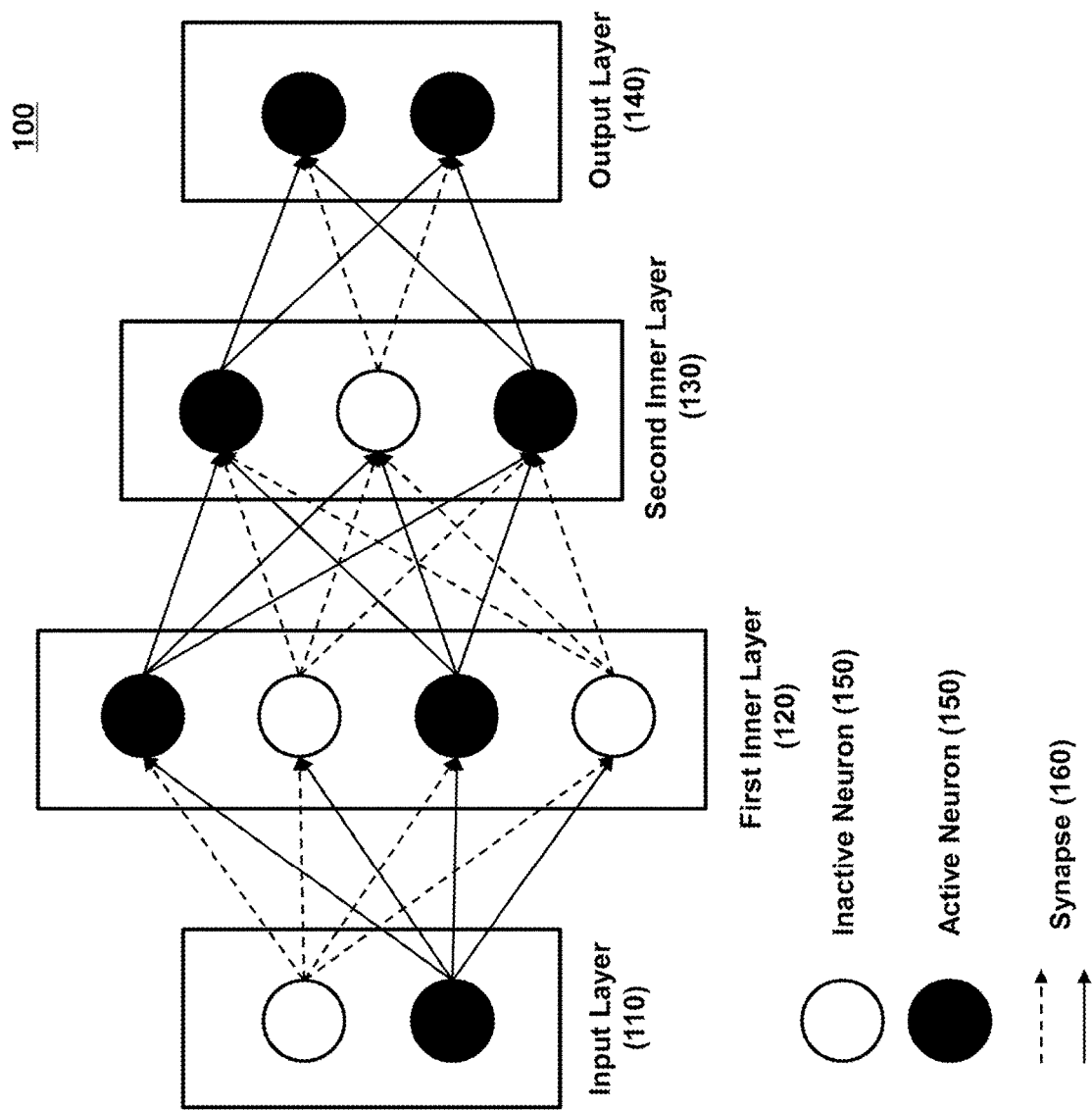
FIG. 1 illustrates a neural network that is pruned by a method according to an embodiment of the present disclosure.

FIG. 1 illustrates a neural network 100 that is pruned by a method according to an embodiment of the present disclosure.

In this embodiment, the neural network 100 includes an input layer 110, a first inner layer 120, a second inner layer 130, and an output layer 140. The first and second inner layers 120 and 130 are connected between the input and output layers 110 and 140.

Each layer contains one or more neurons 150. Neurons 150 that are contained in adjacent layers are connected to each other by synapses 160. For example, the neurons 150 in the input layer 110 and the neurons 150 in the first inner layer 120 are connected to each other by synapses 160 extending from the input layer 110 to the first inner layer 120.

The neural network 100 is trained to perform a predetermined inference operation, such as an image recognition operation. During the training, each synapse 160 is assigned a weight.

According to an embodiment of the present disclosure, a pruning method is applied to the neural network 100. The pruning method is applied to the neural network 100 after the neural network 100 has been trained. That is, the pruning method is applied to the neural network 100 at a state in which the training is completed.

After the neural network 100 is trained and pruned, the neural network 100 can be used to perform the inference operation. In an embodiment, the inference operation includes receiving an input, setting values of the neurons 150 in the input layer 110 based on the input, performing operations at the first and second inner layers 120 and 130 based on the values of the neurons 150 in the input layer and the trained synapses 160, and setting values of the neurons 150 in the output layer 140 based on the operations at the first and second inner layers 120 and 130. The output layer 140 contains one or more neurons 150 whose values each represent a result of the inference operation.

In the pruning operation, the input layer 110 and the first and second inner layers 120 and 130 are pruned. When a layer is pruned, one or more of the neurons 150 within the layer may be activated or deactivated. In the present disclosure, a layer is pruned by setting a threshold value for the layer.

In the present disclosure, a threshold value allocated to a given layer classifies neurons 150 in the given layer into active neurons and inactive neurons. For example, if a value of a neuron 150 is below a threshold value of a layer of the neuron 150, the neuron 150 is classified as an inactive neuron. An inactive neuron is assumed to have a value of 0. That is, the value of the inactive neuron is set to 0 for the purposes of the inference operation. Otherwise, if the value of the neuron 150 is above or equal to the threshold value of the layer, the neuron 150 is classified as an active neuron. An active neuron retains its original value during the inference operation. In FIG. 1, synapses 160 originating from inactive neurons are indicated by dotted lines, and synapses 160 originating from active neurons are indicated by solid lines. In an embodiment, only the synapses 160 originating from active neurons are used by the neural network 100 to perform the inference operation.

During an inference operation, an inactive neuron does not affect values of neurons contained in the next layer, since its value is assumed to be zero. For example, an inactive neuron in the input layer 110 does not impact a value of any of the neurons in the first inner layer 120, and an inactive neuron in the second inner layer 130 does not impact a value of any of the neurons in the output layer 140.

Accordingly, in setting a value of each neuron 150 in a given layer, synapses 160 associated with inactive neurons 150 in a previous layer can be ignored, thereby reducing a computational complexity of the inference operation. In other words, as the number of the inactive neurons 150 in the neural network 100 increases due to the pruning operation, the computational complexity of the inference operation performed by the pruned neural network 100 decreases.

Embodiments of the present disclosure additionally include performing an operation of adjusting the weights of the synapses 160 included in the neural network 100, after the pruning operation is performed, that is, after the threshold values of the input layer 110, the first inner layer 120, and the second inner layer 130 are set and adjusted. By adjusting the weights of the synapses 160, the accuracy of the inference operation is improved.

Various embodiments of the present disclosure therefore improve the accuracy of the inference operation while reducing the computational complexity of the inference operation.

Figure 2:
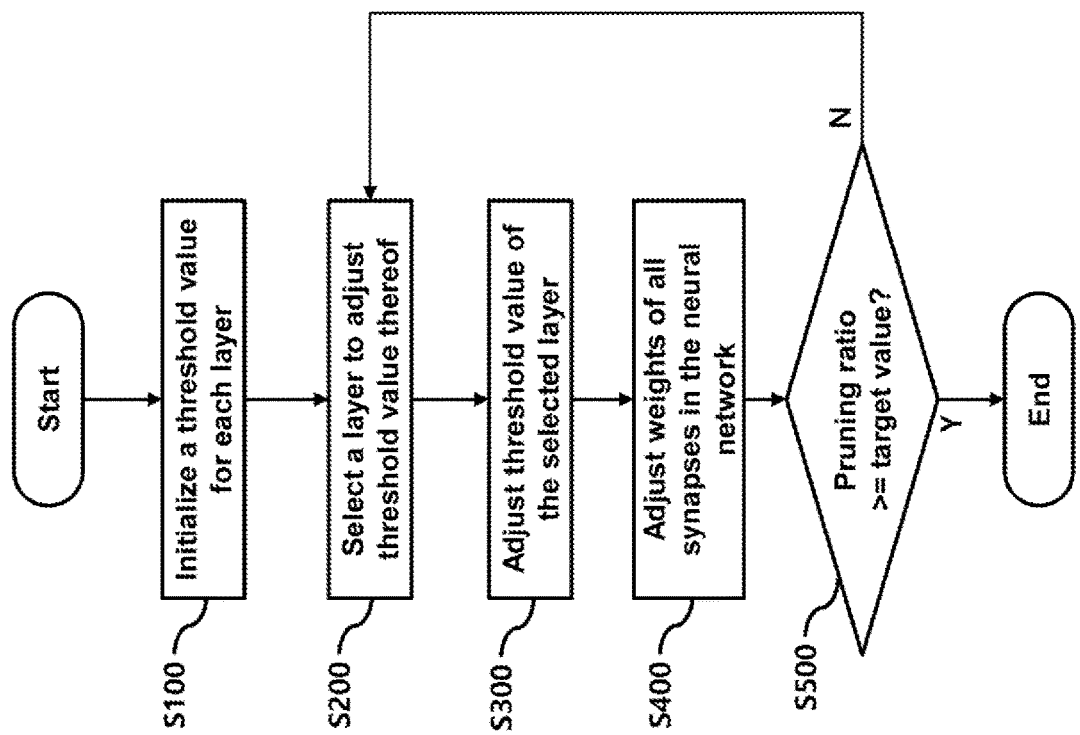
FIG. 2 illustrates a flow chart representing a pruning method according to an embodiment of the present disclosure.

FIG. 2 illustrates a flow chart representing a pruning method according to an embodiment of the present disclosure.

The pruning method according to the present embodiment performs pruning on a convolutional neural network after the convolutional neural network has been trained, such that weights of synapses in the convolutional neural network are determined.

Accordingly, the method illustrated by the flow chart of FIG. 2 is performed when the convolutional neural network is prepared.

First, a threshold value is initialized for each of a plurality of layers in the convolutional neural network at S100. The plurality of layers includes an input layer and inner layers.

A threshold value of a given layer is the criterion used to categorize neurons within the given layer into active or inactive neurons during the pruning method. For example, if a value of a neuron in a layer is below a threshold value of the layer, the neuron is an inactive neuron. Otherwise, the neuron is an active neuron.

Neurons designated as inactive neurons are assumed to have values equal to zero. That is, the value of each inactive neuron is set to zero, for the purposes of an inference operation.

Next, a layer whose threshold value is to be adjusted is selected at S200.

In this embodiment, a layer is selected among the input layer and the inner layers.

At S300, the threshold value of the selected layer is adjusted.

Next, at S400, weights of the synapses in the convolutional neural network are adjusted. The adjustment of weights increases the accuracy of the pruned convolutional neural network, for example.

At S500, it is determined whether a pruning ratio of the convolutional neural network is greater than or equal to a target value. If the pruning ratio is not greater than or equal to the target value, the method returns to S200.

In an embodiment, the convolutional neural network can be pruned in consideration of a computational complexity and accuracy of an inference operation performed by the pruned convolutional neural network. For example, the convolutional neural network can be pruned in order to achieve a predetermined level of computational complexity and a predetermined accuracy. This will be described in detail with reference to FIG. 3.

Figure 3:
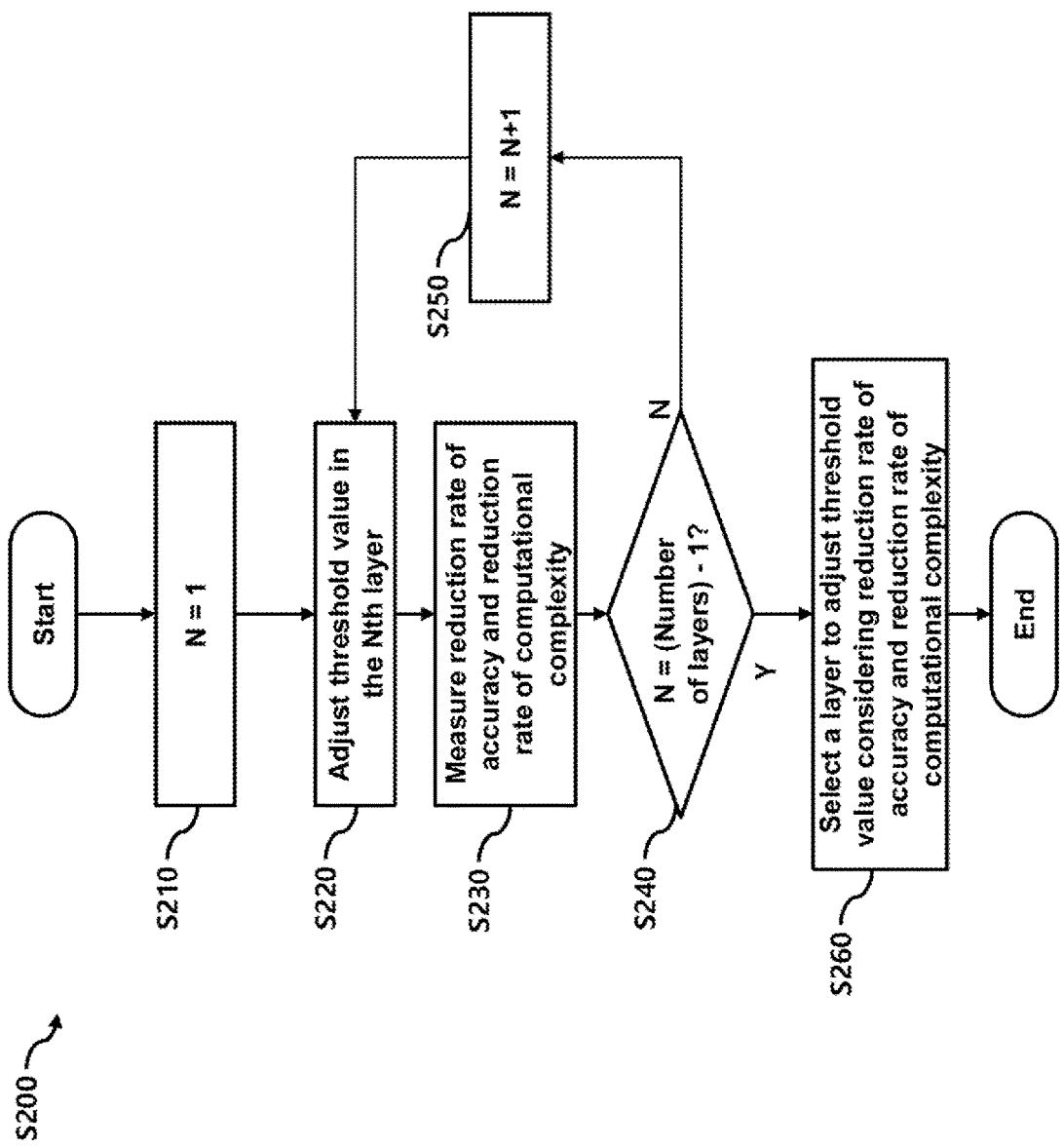
FIG. 3 illustrates a flow chart representing a method for selecting a layer whose threshold value will be adjusted according to an embodiment of the present disclosure.

FIG. 3 illustrates a flow chart representing a method for selecting a layer whose threshold value will be adjusted according to an embodiment of the present disclosure.

A test set of a certain size may be used for the operation of FIG. 3. For example, in an embodiment, a convolutional neural network for image recognition is tested using 50,000 images as a test set.

First, an index N is initialized to 1 at S210. The index N represents one of a plurality of layers in the convolutional neural network. For example, when N=1, the Nth layer is a first layer among the plurality of layers, and corresponds to an input layer. When N=2, the Nth layer is a second layer among the plurality of layers, and corresponds to a first inner layer.

Next, a threshold value is adjusted for the Nth layer at S220. The adjustment of the threshold value may vary according to embodiments. For example, the threshold value may be increased.

According to an embodiment, the threshold value of the Nth layer of the original neural network is adjusted, which means any previous adjustment of a threshold value for a layer is invalidated.

After the threshold value of the Nth layer is adjusted, a reduction rate of computational complexity and a reduction rate of accuracy are measured at S230.

The term "reduction rate of computational complexity" of a layer refers to an amount of computational complexity of the layer that decreases after the threshold value of the layer is adjusted. The amount of computational complexity of the layer may refer to the number of floating-point operations induced by active neurons in the neural network including the layer. In an example, the reduction rate of computational complexity is equal to the computational complexity of the layer before adjustment minus the computational complexity of the layer after adjustment, over the computational complexity of the layer before adjustment. Accordingly, when the computational complexity of the layer decreases after adjustment, the reduction rate of computational complexity of the layer is positive.

The term "reduction rate of accuracy" of a layer refers to an amount of accuracy of the layer that decreases after the threshold value of the layer is adjusted. The amount of accuracy of the layer may refer to an accuracy of an inference operation performed using the layer. In an example, the reduction rate of accuracy is equal to an accuracy of the layer before adjustment minus the accuracy of the layer after adjustment, over the accuracy of the layer before adjustment. Accordingly, when the accuracy of the layer decreases after adjustment, the reduction rate of accuracy of the layer is positive.

The reduction rate of computational complexity and the reduction rate of accuracy can be measured by applying the test set to the original neural network in which the threshold value of each layer is not adjusted, and by applying the test set to the adjusted neural network in which the threshold value of the Nth layer is adjusted.

Then, it is determined whether the index N is equal to a maximum number, which is less than number of layers by 1, at S240. The maximum number, which is less than number of layers by 1, corresponds to a number of the plurality of layers in the neural network, except the output layer.

If the index is not the maximum number, the index N is incremented up by 1 at S250, and the process returns to S220 and repeats the operations described above.

Accordingly, the reduction rate of computational complexity and the reduction rate of accuracy for each layer are determined when the threshold value of each layer is adjusted.

If the index N is equal to the maximum number at S240, the process goes to S260.

At S260, a layer is selected among the plurality of layers in consideration of the reduction rates of accuracy and reduction rates of computational complexity which were previously acquired at S230. In an embodiment, the layer is selected by calculating enhancement ratios respectively corresponding to the plurality of layers, and selecting the layer with the highest enhancement ratio among the plurality of layers. The enhancement ratio corresponding to each of the layers is calculated by applying the reduction rate of computational complexity of the layer and the reduction rate of accuracy of the layer to an enhancement equation.

In an embodiment, the enhancement equation is an enhancement ratio, and includes dividing the reduction rate of computational complexity of the layer by the reduction rate of accuracy of the layer. Accordingly, the enhancement equation increases as the reduction rate of accuracy decreases and as the reduction rate of computational complexity increases. In other embodiments, another enhancement equation may be used to select a layer.

Returning to FIG. 2, if a layer to adjust a threshold value is selected at S200, the threshold value is adjusted for the layer at S300. Next, the weights are adjusted for the entire synapses in the neural network at S400.

In general, the accuracy of a layer is decreased when a threshold value of the layer is decreased at S300. At S400, the adjustment of the weights of the synapses can increase the accuracy of the layer, and of the neural network as a whole.

At S400, the weights of all synapses are adjusted so that the decrease in the accuracy due to the change in threshold values at S300 is limited, and the accuracy is increased.

Adjusting the weights of the synapses, for example at S400 of FIG. 2, will be described in detail with reference to FIG. 4 and FIG. 5.

Figure 4:
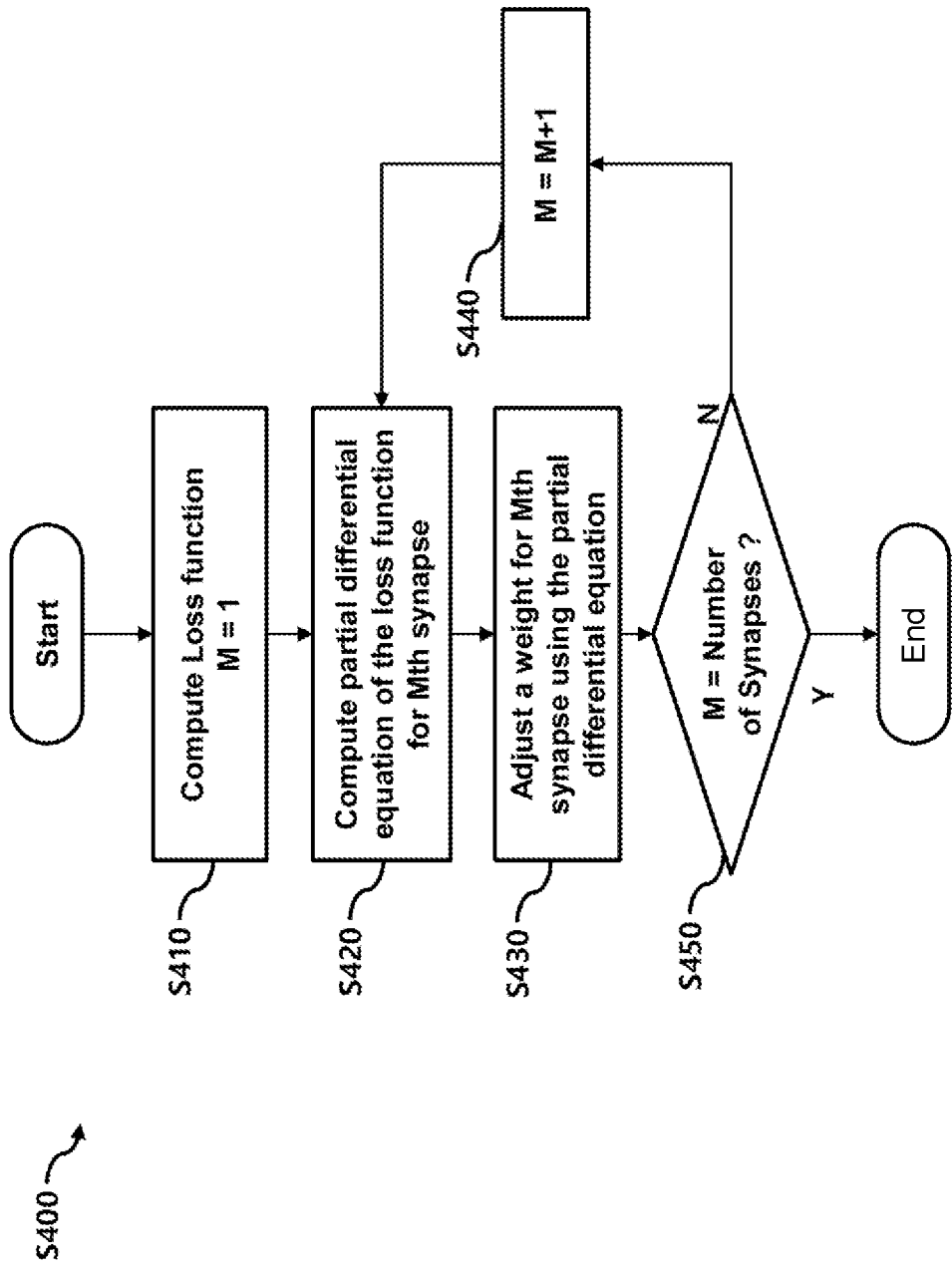
FIG. 4 illustrates a flow chart representing a method for adjusting a weight of a synapse according to an embodiment of the present disclosure.
Figure 5:
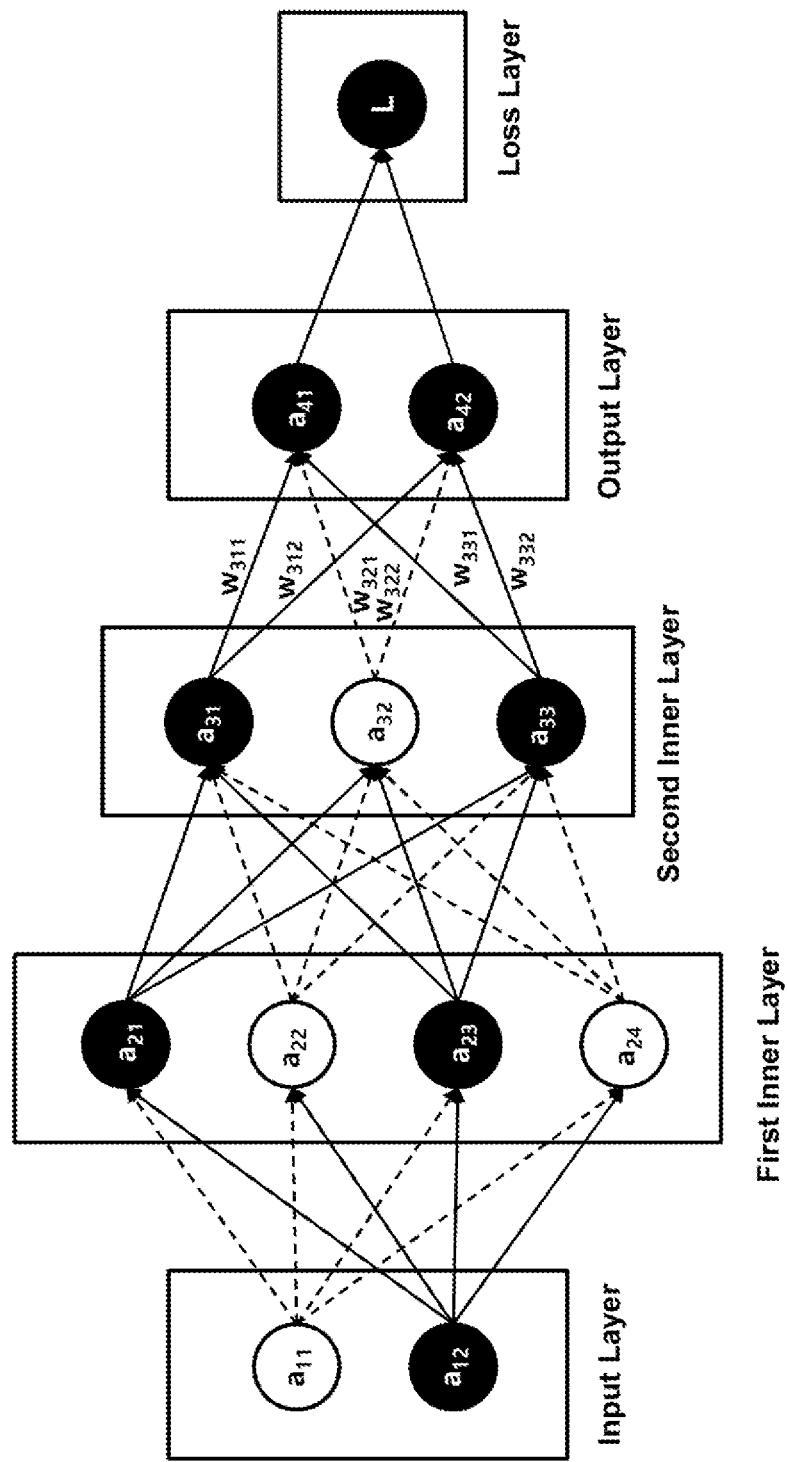
FIG. 5 illustrates a neural network representing a method for adjusting a weight of a synapse according to an embodiment of the present disclosure.

FIG. 4 illustrates a flow chart representing a method for adjusting a weight of a synapse according to an embodiment of the present disclosure, and FIG. 5 illustrates a neural network representing a method for adjusting a weight of a synapse according to an embodiment of the present disclosure.

First, a loss function L is calculated, and an index M is initialized to 1 at S410. The index M corresponds to one of the synapses in the neural network.

The neural network of FIG. 5 includes a plurality of neurons, such that each of a plurality of layers in the neural network of FIG. 5 includes one or more neurons. Each of the plurality of neurons has a value. The plurality of layers in the neural network of FIG. 5 further includes a loss layer, compared to the plurality of layers in the neural network of FIG. 1. The loss layer contains one neuron whose value corresponds to a value of the loss function L.

The plurality of layers further includes an output layer and an input layer. The values of neurons in the output layer correspond to an output of an inference operation performed by the neural network based on input data applied to the input layer, and can be expressed as a vector, which includes the values of neurons as elements thereof.

In this disclosure, a vector actually output from the pruned neural network when the input data is provided is referred to as an output vector, and a vector to be preferably output according to the input data is referred to as a truth vector. For example, a truth vector is an expected output vector that matches exactly the ground truth provided with input vectors in a supervised learning.

In this case, the loss function L can be expressed as a function for calculating a distance between the output vector and the truth vector. The distance between the output vector and the truth vector may vary depending on inactive neurons in the neural network.

In one embodiment, the loss function L may be the distance itself between the output vector and the truth vector. However, the loss function L can be defined differently according to various embodiments.

At S420, a partial differential equation of the loss function L for the Mth synapse is calculated.

For example, with reference to FIG. 5, the partial differential equation of the loss function L for neurons $a_{41}$ and $a_{42}$ can be expressed as Equation 1.

$$\frac{\partial L}{\partial a_{41}}, \frac{\partial L}{\partial a_{42}} \quad \text{[Equation 1]}$$

Where, in FIG. 5, a first neuron of the second inner layer is represented by $a_{31}$, a first neuron of the output layer is represented by $a_{41}$, and a weight of the synapse between the two is expressed by $w_{311}$. Similar rules apply to other neurons and synapses.

In addition, the partial differential equations of the loss function L for synapses $w_{311}$ and $w_{312}$ can be expressed as Equations 2 and 3.

$$\frac{\partial L}{\partial w_{311}} = \frac{\partial L}{\partial a_{41}} \frac{\partial a_{41}}{\partial w_{311}} = \frac{\partial L}{\partial a_{41}} a_{31} \quad \text{[Equation 2]}$$

$$\frac{\partial L}{\partial w_{312}} = \frac{\partial L}{\partial a_{41}} \frac{\partial a_{41}}{\partial w_{312}} = \frac{\partial L}{\partial a_{41}} a_{32} \quad \text{[Equation 3]}$$

Values of Equations 2 and 3 may be calculated from values of Equation 1.

In FIG. 5, since the neuron $a_{32}$ is an inactive neuron, its value is given as 0. The partial differential equations of the loss function L with respect to the weights of the remaining synapses can be calculated based on the above equations.

For the calculation of values from the partial differential equations, a numerical analysis method may be applied.

The weight of the synapse may be adjusted by using values calculated from the partial differential equation derived at S420.

For example, the weight $w_{311}$ of the synapse can be adjusted to a new weight $w'_{311}$ by referring to Equation 4.

$$w'_{311} = w_{311} - \alpha \frac{\partial L}{\partial w_{311}} \quad \text{[Equation 4]}$$

In Equation 4, $\alpha$ is a positive proportional constant which may be variably set according to a network. For example, $\alpha$ may have an initial value between $10^{-6}$ and $10^{-2}$.

Equation 4 shows one embodiment for adjusting the weight. The specific equation used to adjust the weight may vary according to various embodiments.

At S450, if the index M is different from the total number of synapses, the index M is incremented up by 1 at S440, and the steps described above are repeated for the remaining synapses.

If the index M is equal to the total number of synapses at S450, the process ends, since the weights of all the synapses have been adjusted.

Returning to FIG. 2, at S500 the pruning ratio is compared with the target value, and if the pruning ratio is equal to or greater than the target value, the process ends. Otherwise, the process returns to S200 and the above-described operation is repeated.

When the above-described operation is repeated, results of adjusting the threshold values at S300 and adjustments or weights at S400 are applied to the neural network, so that next loop of operations are performed based on the neural network with the adjusted threshold values and the adjusted weights.

The pruning ratio may be defined as a ratio of the number of inactive neurons in the neural network to the total number of neurons in the neural network.

The neurons of the neural network are pruned based on the target value. When the target value is relatively large, the pruning ratio is adjusted to be relatively large. For example, as the target value increases, the threshold value will be adjusted so that the more inactive neurons are generated. As a result, the pruning ratio increases, and a computation speed of the neural network increases. That is, a computational complexity of the neural network decreases when the pruning ratio increases.

However, as the pruning ratio increases, the accuracy of the neural network may decrease. In other words, as the pruning ratio increases, the reduction rate of accuracy may increase.

The reduction rate of accuracy and the reduction rate of computational complexity required for the neural network may vary according to various embodiments. Accordingly, the target value can be adjusted in consideration of the requirements of the neural network. For example, the target value can be adjusted based on the desired application for the neural network.

Figure 6:
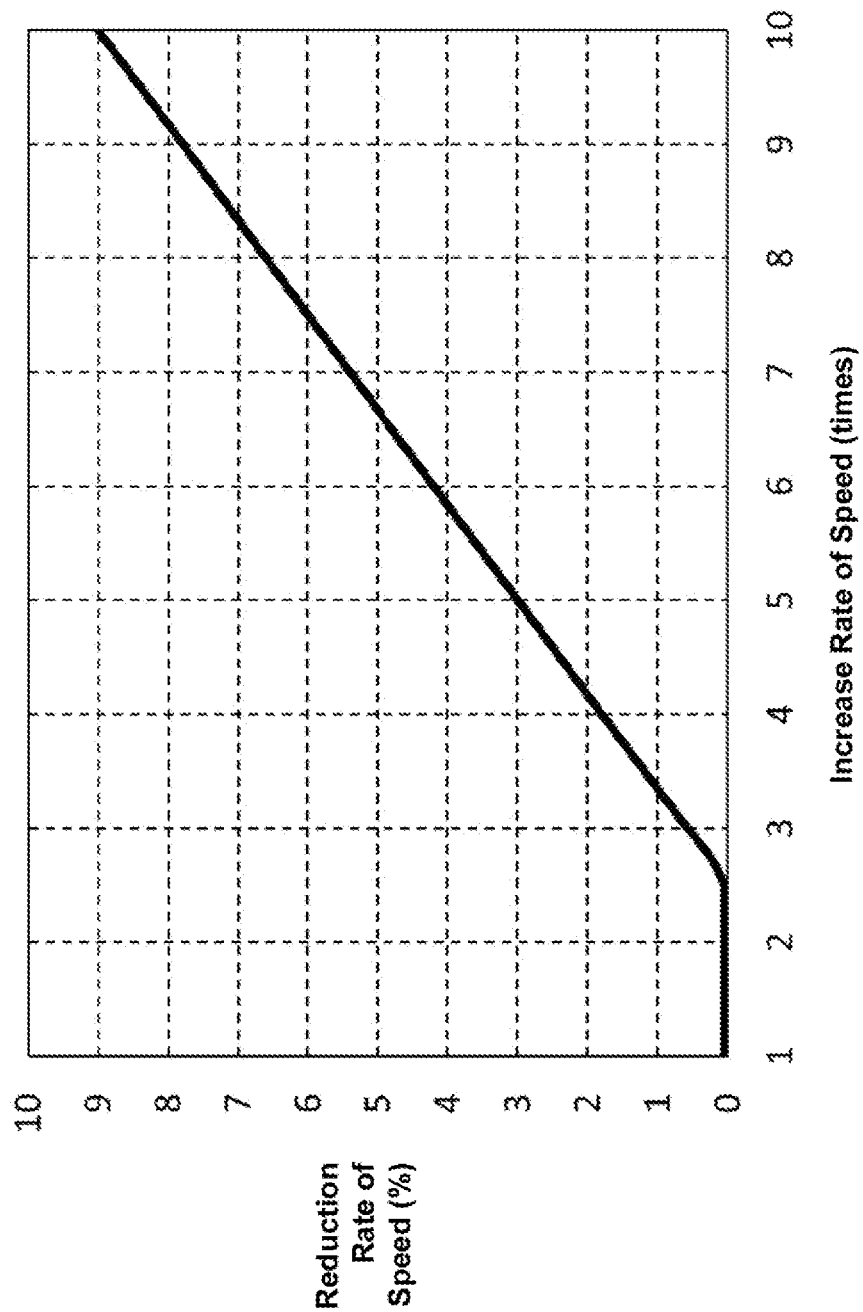
FIG. 6 illustrates a graph representing an effect of a pruning method according to an embodiment of the present disclosure.

FIG. 6 is a graph showing the relationship between an increase rate of speed and a reduction rate of accuracy in a neural network to which a pruning method according to an embodiment of the present disclosure is applied.

The convolutional neural network used in the experiments was AlexNet, which is a convolutional neural network developed by Alex Krizhevsky, Ilya Sutskever and Geoffrey E. Hinton. The input data used in the experiments were 50,000 images. The Alexnet neural network was pruned according to embodiments of the present disclosure.

The Alexnet neural network was tested before and after being pruned to various degrees. The Alexnet neural network was tested by measuring a time period required to perform an inference operation, and an accuracy of the inference operation. The graph illustrated in FIG. 6 is based on data in the following Table 1.

TABLE 1

| Increase Rate of Speed (times) | Reduction Rate of Accuracy (%) |
|---|---|
| 1 | 0 |
| 2.2 | 0 |
| 2.4 | 0 |
| 2.5 | 0 |
| 2.7 | 0.2 |
| 2.9 | 0.45 |
| 3 | 0.58 |
| 4 | 1.8 |
| 5 | 3 |
| 6 | 4.2 |
| 7 | 5.4 |
| 8 | 6.6 |
| 9 | 7.8 |
| 10 | 9 |

Table 1 lists one column corresponding to an increase rate of a speed required to perform the inference operation after the neural network was pruned. For example, the increase rate of the speed was calculated by comparing the time required to perform the inference operation using the pruned neural network with the time required to perform the inference operation using the original neural network. Table 1 also lists another column corresponding to a reduction rate of accuracy.

As shown in the graph of FIG. 6 and Table 1, the reduction rate of accuracy remains at 0% while the speed of the processes performed by the neural network increases up to 2.5 times the time required to perform the inference operation using the original neural network. However, as the number of inactive neurons increases, the reduction rate of accuracy increases to 9% while the increase rate of speed increases by 10 times.

FIG. 6 and Table 1 illustrate that a neural network can be pruned in order to increase the speed of operations performed by the neural network. The neural network can be pruned up to a certain pruning ratio without significantly affecting the accuracy of the operations performed by the neural network. However, when the pruning ratio exceeds a certain level, the operations performed by the neural network become less accurate.

In certain embodiments, a neural network is pruned to a level in which the speed of operations performed by the neural network increases, but the accuracy of the operations performed by the neural network does not decrease.

Figure 7:
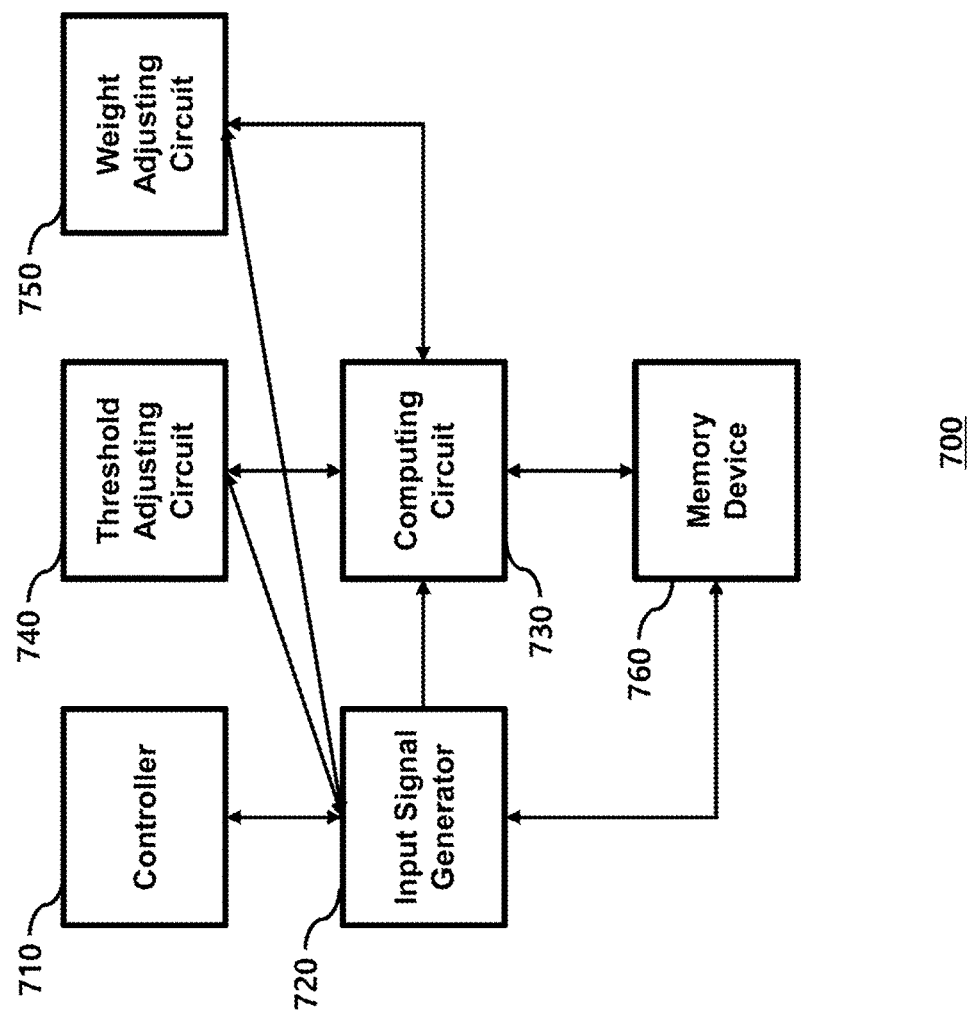
FIG. 7 illustrates a block diagram representing a pruning device according to an embodiment of the present disclosure.

FIG. 7 illustrates a block diagram representing a pruning device 700 according to an embodiment of the present disclosure.

The pruning device 700 includes a controller 710, an input signal generator 720, a computing circuit 730, a threshold adjusting circuit 740, and a weight adjusting circuit 750.

The pruning device 700 may further include a memory device 760.

The controller 710 generally controls the above-described pruning operation. In order to control the pruning operation, the controller 710 may control the threshold adjusting circuit 740 and the weight adjusting circuit 750. The controller 710 may control computing operations during the pruning operation. In order to control the computing operations, the controller 710 may control the input signal generator 720 and the computing circuit 730.

The input signal generator 720 generates input data used for the computing operations. For example, neuron values of an input layer are generated from the input data. That is, the input layer includes a plurality of neurons, and values are assigned to the plurality of neurons based on the input data.

The computing circuit 730 performs the computing operations using the input data. The operation may include a convolution operation, and may include a plurality of addition and multiplication operations. For example, the computing circuit 730 may determine values of a plurality of neurons in an output layer, respectively, using the values of the neurons of the input layer, as well as weights of a plurality of synapses included in a neural network.

The threshold adjusting circuit 740 may perform various operations, such as the operations in steps S200 and S300 of FIG. 2. That is, the threshold adjusting circuit 740 may adjust a threshold value for each layer in the neural network, may select a layer whose threshold value should be adjusted, and may adjust the threshold value of the selected layer.

The operations performed by the threshold adjusting circuit 740 are substantially the same as the operations described with respect to FIG. 3.

The computing circuit 730 may perform a computation operation in the convolutional neural network after a threshold value of a layer in the convolutional neural network is adjusted by the threshold adjusting circuit 740.

A reduction rate of accuracy, a reduction rate of computational complexity, and the like can be measured by the threshold adjusting circuit 740.

For this, the threshold adjusting circuit 740 may communicate with the input signal generator 720 and the computation circuit 730, and may transmit and receive signals for the threshold adjusting operation from the input signal generator 720 and the computation circuit 730.

The weight adjusting circuit 750 may perform an operation corresponding to S400 of FIG. 2. That is, the weight adjusting circuit 750 may adjust the weight of a synapse with reference to a value of a partial differential equation of a loss function with respect to the synapse. In an embodiment using Equation 4 to update a weight, a weight of a synapse is decreased when a value of a partial differential equation corresponding to the weight is positive, and the weight of the synapse is increased when the value of the partial differential equation corresponding to the weight is negative.

Since the series of operations includes a combination of addition operations and multiplication operations, the weight adjusting circuit 750 may perform the series of operations by controlling the input signal generator 720 and the computing circuit 730.

The memory device 760 stores data for the operations. For example, the initial weights of the synapses in the convolutional neural network, the input data included in a test set, and temporary data used during the computing operations can be stored in the memory device 760.

Through the method and device for pruning a neural network according to the present disclosure, a computational complexity of the neural network can be remarkably reduced while maintaining the accuracy of an inference operation performed by the neural network.

Although various embodiments have been described for illustrative purposes, it will be apparent to those skilled in the art that various changes and modifications may be possible.

What is claimed is:

1. A method for pruning a neural network, the method comprising:
   initializing a plurality of threshold values respectively corresponding to a plurality of layers included in the neural network;
   selecting one of the plurality of layers;
   adjusting the threshold value of the selected layer; and
   adjusting a plurality of weights respectively corresponding to a plurality of synapses included in the neural network,
   wherein selecting one of the plurality of layers comprises:
      adjusting the plurality of threshold values respectively corresponding to the plurality of layers;
      determining reduction rates of accuracy and reduction rates of computational complexity respectively for the plurality of layers based on the adjusted plurality of threshold values; and
      selecting a layer among the plurality of layers according to the reduction rates of accuracy and the reduction rates of computational complexity corresponding to the plurality of layers, and,
      wherein the selected layer has a highest enhancement ratio among the plurality of layers, the enhancement ratio of the selected layer being a reduction rate of computational complexity of the selected layer divided by a reduction rate of accuracy of the selected layer.

2. The method of claim 1, wherein the neural network is a convolutional neural network, and
   wherein the plurality of layers includes an input layer and one or more inner layers.

3. The method of claim 1, wherein a value of a neuron in the selected layer that is less than the threshold value is set to be 0.

4. The method of claim 1, further comprising:
determining whether a pruning ratio of the neural network is less than a target value after the plurality of weights corresponding to the plurality of synapses have been adjusted.

5. The method of claim 4, the selected layer being a first layer, the method further comprising:
when the pruning ratio is less than the target value, selecting a second layer among the plurality of layers, adjusting the threshold value of the second layer, and adjusting the plurality of weights respectively corresponding to the plurality of synapses after the threshold value of the second layer has been adjusted.

6. The method of claim 1, wherein adjusting the plurality of weights of the plurality of synapses comprises:
calculating a loss function based on an output vector corresponding to output data, the output data being output from the neural network when input data is provided to the neural network;
calculating a plurality of partial differential equations of the loss function corresponding to the plurality of weights of the plurality of synapses; and
adjusting the plurality of weights according to a plurality of current weights of the plurality of synapses and the plurality of partial differential equations.

7. The method of claim 6, wherein the loss function includes a variable corresponding to a distance between the output vector and a truth vector, the truth vector being given as a truth corresponding to the input data.

8. The method of claim 6, wherein each of the plurality of partial differential equations comprises a partial differential equation of a synapse connecting a start neuron with an end neuron, the start neuron being included in a lower level layer than the end neuron, the partial differential equation of the synapse connecting the start neuron with the end neuron being based on a value of the start neuron and a partial differential equation of a synapse that connects the end neuron with a neuron in a higher level layer than the end neuron.

9. The method of claim 6, wherein adjusting the plurality of weights of the plurality of synapses includes:
decreasing a weight of a synapse when the partial differential equation corresponding to the weight is positive; and
increasing the weight of the synapse when the partial differential equation corresponding to the weight is negative.

10. A device for pruning a neural network, the device comprising:
a computing circuit configured to perform a convolution operation including an addition operation and a multiplication operation;
an input signal generator configured to generate input data, and to input the input data to the computing circuit;
a threshold adjusting circuit configured to select a layer from among a plurality of layers in the neural network and adjust a threshold value of the selected layer;
a weight adjusting circuit configured to adjust a plurality of weights of a plurality of synapses, respectively, which are included in the neural network; and
a controller configured to prune the neural network by controlling the threshold adjusting circuit and the weight adjusting circuit,
wherein the selected layer has a highest enhancement ratio among the plurality of layers, the enhancement ratio of the selected layer being a reduction rate of computational complexity of the selected layer divided by a reduction rate of accuracy of the selected layer.

11. The device of claim 10, further comprising a memory device configured to store initial weights of the plurality of synapses, the input data, or both.

12. The device of claim 10, wherein the controller controls the threshold adjusting circuit to adjust the threshold value of the selected layer among the plurality of layers, and then the controller controls the weight adjusting circuit to adjust the plurality of weights of the plurality of synapses in the neural network.

13. The device of claim 10, wherein the controller controls the threshold adjusting circuit, the computing circuit, or both, to assume a value of a neuron in the selected layer that is less than the threshold value of the selected layer is 0.

14. The device of claim 13, wherein the controller further controls the threshold adjusting circuit and the weight adjusting circuit to operate when a pruning ratio of the neural network is smaller than a target value, the pruning ratio being equal to a ratio of a number of neurons in the neural network having a value of 0 to a total number of neurons in the neural network.

15. The device of claim 10, wherein the weight adjusting circuit calculates a loss function and adjusts the plurality of weights of the plurality of synapses with a plurality of partial differential equations of the loss function relative to the plurality of synapses, respectively.

* * * * *